United States Patent [19]

Mazziotti

[11] Patent Number: 4,515,574
[45] Date of Patent: May 7, 1985

[54] UNIVERSAL JOINT SEAL WITH MULTIPLE LIPS

[75] Inventor: Philip J. Mazziotti, Toledo, Ohio

[73] Assignee: The Zeller Corporation, Defiance, Ohio

[21] Appl. No.: 467,131

[22] Filed: Feb. 16, 1983

[51] Int. Cl.³ .................. F16D 3/33; F16C 33/78; F16J 15/34
[52] U.S. Cl. .................... 464/131; 277/95; 464/128; 384/482
[58] Field of Search ............... 464/128, 130, 131, 133, 464/7, 11; 308/187.2; 277/95, 212 F

[56] References Cited

U.S. PATENT DOCUMENTS

| | | | |
|---|---|---|---|
| 2,773,367 | 12/1956 | Slaght | 464/130 X |
| 3,138,942 | 6/1964 | Kayser | 464/131 |
| 3,200,615 | 8/1965 | Stokely | 464/128 X |
| 3,218,692 | 11/1965 | Kayser | 464/131 X |
| 3,377,820 | 4/1968 | Smith | 464/131 |
| 3,457,732 | 7/1969 | Decouzon | 464/131 |
| 3,581,524 | 6/1968 | Pitner | 464/131 |
| 3,779,039 | 12/1973 | Schultenkamper | 464/128 X |
| 3,788,100 | 1/1974 | Pitner | 464/131 X |
| 3,906,746 | 9/1975 | Haines | 464/131 |
| 4,021,085 | 5/1977 | Willyard | 464/131 X |

Primary Examiner—Stuart S. Levy
Assistant Examiner—Thomas R. Hannon
Attorney, Agent, or Firm—Allen D. Gutchess, Jr.

[57] ABSTRACT

A universal joint seal is provided for a universal joint, which seal is more effective in retaining lubricant and in preventing the ingress of water and contaminants, particularly when engaging surfaces which tend to be rough. In a specific form, the universal joint includes a cross having a body and trunnions extending therefrom with an annular shoulder and an adjacent surface of circular cross section at the juncture of said body and each of the trunnions. The bearing cup has an open end which receives the trunnion and can have an annular groove adjacent the open end. The universal joint seal comprises a resilient sealing member having at least two circular lips which engage the annular shoulder of the cross and at least one additional lip which engages the adjacent surface of the cross. The sealing member also has at least one lip which engages the open end of the cup and additional lips which engage the groove portion of the cup. Thus, at least three seals are provided between the seal and the cross and between the seal and the cup to contain lubricant in the cup and to prevent the ingress of water and contaminants.

3 Claims, 4 Drawing Figures

UNIVERSAL JOINT SEAL WITH MULTIPLE LIPS

This invention relates to a universal joint seal which is more effective to contain lubricant and to prevent the ingress of water and contaminants.

Seals between crosses and bearing cups of universal joints must meet difficult conditions. Since there is relative rotational movement between the cross trunnions and the bearing cups, the seals have to provide the sealing function while encountering movement between the seals and the sealing surfaces of the cross and/or cups. The seals must also contain the lubricant in the cups between the inner surface thereof and the trunnions even during high rotational movement of the universal joint and when subject to torque during operation of the drive train in which the universal joint is located. At the same time, however, with universal joints having lubricant fittings so that the bearings can be periodically lubricated, the seals must enable some of the old lubricant to be flushed from the bearings during lubrication. In addition, the universal joint seals must be effective in preventing the ingress of water and contaminants which can quickly cause bearing failure even in small amounts. Preferably, the seals also should not project beyond the peripheries of the bearing cups so as not to inhibit assembling of the cross and the cups along with the yokes of the universal joint.

A number of seals for use between crosses and bearing cups of universal joints are known in the art. One common seal includes a resilient sealing member having one portion contoured to the shape of the cross at the juncture of the body and trunnion and another portion contoured to the shape of the surface near the open end of the bearing cup so as to provide wide areas of contact between the sealing member and both the cross and cup. Such seals, however, are sometimes less than effective, particularly when the surfaces of the cross and cup which are engaged by the sealing member are relatively rough, having circular irregularities therein. Abrasion and wear of the sealing member also can be a problem with this type of seal and universal joint surfaces. Other universal joint seals are shown in the following U.S. Pat. Nos.: 2,773,367, issued to W. W. Slaght on Dec. 11, 1956; 3,138,942 issued to J. A. Kayser on June 30, 1964; 3,377,820 issued to W. J. Smith, Jr., on Apr. 16, 1968; 3,581,524 issued to A. Pitner on June 1, 1971; 3,788,100 issued to A. Pitner on Jan. 29, 1974; and 3,906,746 issued to C. W. Haines on Sept. 23, 1975.

The present invention provides an improved universal joint seal having multiple lips to provide more effective seals. The cross of the universal joint includes a body and four trunnions with the cross commonly having an annular shoulder and an adjacent surface of circular cross section at the juncture of the body and each trunnion. This adjacent surface of circular cross section usually is larger in diameter than the trunnion. The surfaces of the annular shoulder and adjacent surface often are not as smooth, having circular surface irregularities, as the trunnions and certain other portions of the universal joint, rendering an effective seal more difficult.

Each bearing cup of the universal joint has an open end which receives one of the trunnions and often has a groove adjacent the open end with the wall thickness at the open end being thinner than other wall portions of the cup. The surfaces of the end portion and adjacent groove of the cup likewise may not be as smooth, having circular surface irregularities, as certain other portions of the universal joint.

In a specific form, the universal joint seal according to the invention includes a resilient sealing member having multiple lips engaging the shoulder and adjacent surface of the cross and also engaging the open end portion of the bearing cup. More specifically, the resilient sealing member has an inwardly-extending first portion having two circular narrow lips engaging the annular shoulder of the cross and a third, wider lip engaging the annular surface of circular cross section. The first portion of the seal also has a fourth, larger lip extending in a direction opposite the first two lips and engaging the wall of the bearing cup at the open end. A second portion of the sealing member has an inwardly-extending narrow lip near its edge which engages the groove of the bearing cup. An additional narrow lip at the edge of the second portion of the sealing member engages the bearing cup surface on the side of the groove opposite the open end. Hence, the seal according to the invention provides at least three circular areas of sealing engagement of the sealing member with the cross and also at least three circular areas of sealing engagement of the sealing member with the bearing cup.

The wider and larger lips of the resilient sealing member serve primarily as lubricant-control seals to retain lubricant in the bearing cup. The outer, narrow lips which engage portions of the cross and the cup beyond the wider and larger seals serve primarily to prevent the ingress of water and contaminants. More than two of the narrow lips can be provided, particularly for larger universal joints where there is more room for such lips. These narrow lips preferably have squared ends which provide narrow lines of contact with the cross or cup, with corner edges of the lip ends providing substantially line contact with the cross or cup when the lips are deformed after assembly of the cross and cup. This provides good sealing engagement with the surfaces, particularly when they have circular surface irregularities therein. In contrast, previous seals were designed to have contours fitting with associated contours of the cross and cup to provide broad engagement therebetween. Such seals did not have as effective sealing engagement with the surfaces when such surfaces tended to be rough and have irregularities therein.

The narrow lips of the resilient sealing member also can deform substantially when the cup and the cross are assembled so that the seal can accommodate wider tolerance ranges in the universal joint. Also, the lips form annular cavities therein which can trap lubricant tending to egress and water and contaminants tending to ingress. In such instances, the trapped lubricant, in turn, tends to be effective in inhibiting the ingress of contaminants and water.

The sealing member also is designed to fit with the bearing cup in a manner such that the seal does not project beyond the outer surface of the bearing cup, which facilitates assembly of the bearing cup with the trunnion by inserting the bearing cup through an opening in the universal joint yoke. The seal is also effective to contain the lubricant and to prevent ingress of water and contaminants even during relative rotational movement of the trunnion and the bearing cup and during high rotational speeds of the universal joint. At the same time, however, the seal is sufficiently soft so that if additional lubricant is supplied through the cross to the needle bearings in the bearing cup, old lubricant can be flushed out between the universal joint seal and the open end portion of the bearing cup.

It is, therefore, a principal object of the invention to provide a universal joint seal for a universal joint having improved sealing properties with a cross and cup of the joint.

Another object of the invention is to provide a universal joint seal capable of accommodating greater tolerance ranges or dimensional variations in the cross and cups of the universal joint.

A further object of the invention is to provide a universal joint seal having at least three lips engagable with the cross and at least three lips engagable with the cup of a universal joint to provide effective lubricant and contaminant seals.

Yet another object of the invention is to provide a universal joint seal having narrow lips engagable with surfaces of the cross and the cup of the joint which provide narrow lines of sealing contact between the lips and the surfaces.

Still another object of the invention is to provide a universal joint seal capable of achieving greater sealing effectiveness with surfaces of a cross and cup of the joint which have circular surface irregularities.

Many other objects and advantages of the invention will be apparent from the following detailed description of a preferred embodiment thereof, reference being made to the accompanying drawings, in which.

Figure 1:
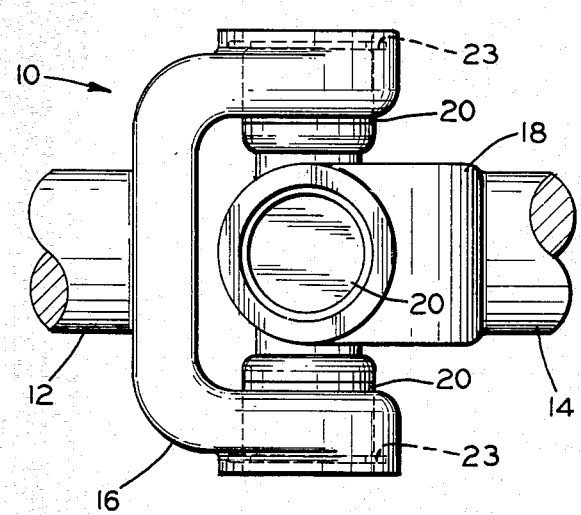
FIG. 1 is a view in elevation of an assembled universal joint connecting two shafts and embodying the invention.

Referring to FIG. 1, a universal joint embodying the invention is indicated at 10 and connects driving and driven shafts 12 and 14 in the conventional manner. The joint 10 includes two yokes 16 and 18 disposed at mutually perpendicular angles with bearing cups 20 held in arms of the yokes by suitable means, such as retaining rings 22 (FIG. 2) which are held in grooves 23 (FIG. 1) in the arms of the yokes 16 and 18, as is well known in the art.

Figure 2:
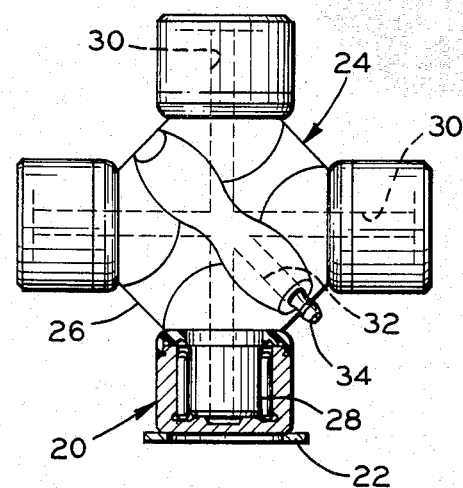
FIG. 2 is a view in elevation of a cross of the universal joint and bearing cups assembled therewith, with one bearing cup and seal shown in section.
Figure 3:
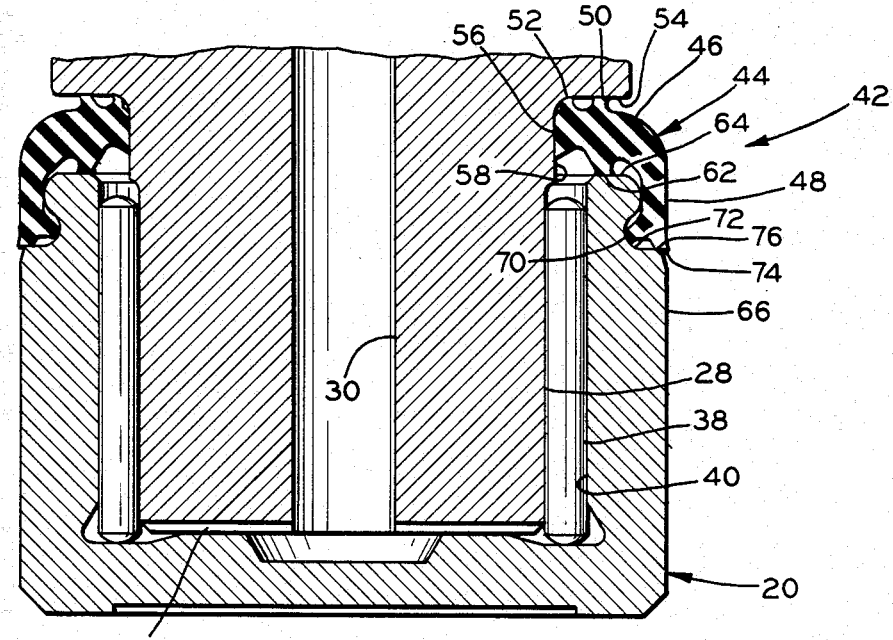
FIG. 3 is a greatly enlarged, fragmentary view in cross section of a trunnion of a universal joint cross, a bearing cup, and a universal joint seal according to the invention, in assembled relationship.

Referring to FIG. 2, a cross 24 of the universal joint includes a body 26 with trunnions 28 extending from the body at mutually perpendicular angles. The body 26 and the trunnions 28 are provided with lubrication passages 30 which communicate with a supply passage 32 and a lubricant fitting 34. The passages 30 direct lubricant to the end of each of the trunnions 28 which has a cross passage 36 (FIG. 3) to supply the lubricant to needle bearings 38 located between an inner surface 40 of the bearing cup 20 and the trunnion 28. With this arrangement, the needle bearings 38 can be lubricated periodically through the fitting 34 to minimize the possibility of the bearings drying out and the universal joint freezing.

A universal joint seal 42 in accordance with the invention is provided to seal off the annular space between the bearing cup 20 and the cross 24. The seal 42 comprises a resilient sealing member 44 which, in this instance, is of generally L-shaped configuration in transverse cross section, although the shape will vary with different universal joints. The member 44 includes a first portion or leg 46 extending inwardly, transversely to the trunnion 28, and a second portion or leg 48 extending over the end of the cup 20. The sealing member 44 is made entirely of resilient material, preferably of synthetic rubber with a typical hardness of 80–95 durometers, and does not require metal inserts or metal backing as some seals heretofore employed, such seals being relatively expensive.

Resilient sealing members heretofore formed between the cups and crosses of universal joints commonly have been designed with contours conforming to the contours of the cross at the juncture of the body and trunnions and also with the contours of the open ends of the bearing cups. The purpose was to provide a large contact area which might be expected to provide better seals. However, the surfaces at the junctures of the cross body and trunnions and the contoured open ends of the bearing cups have not always been as smooth as other portions of the cross and cups. Such surfaces commonly have had circular irregularities which have prevented effective seals with the sealing member, in some instances. Also, substantial abrasion has resulted to the resilient sealing member at times where relative movement occurs between the cross and/or cup and the sealing member.

With the sealing member 44 in accordance with the invention, the first portion 46 of the sealing member 44 has first and second narrow circular lips 50 and 52 on the outer surface thereof. These engage an annular, substantially planar shoulder 54 of the cross 24 along narrow, annular areas to provide two seals between the sealing member 42 and the cross 24. The first portion 46 of the sealing member 44 also has a third, wider lip 56 at the end, which is at least three times as wide as the lips 50 and 52, and engages a surface 58 of circular cross section adjacent the shoulder 54. The lip 56 provides a third seal for the sealing member 44 along a circular area or band where it engages the surface 58. Thus, the lips 50, 52 and 56 provide three circular sealing areas with the shoulder 54 and the adjacent surface 58 to provide three seals between the universal joint seal 42 and the cross 24. The lip 56 primarily contains lubricant in the space between the trunnion 28 and the inner surface 40 of the cup 20 while the outer lips 50 and 52 primarily inhibit ingress of water and other contaminants into that space.

Figure 4:
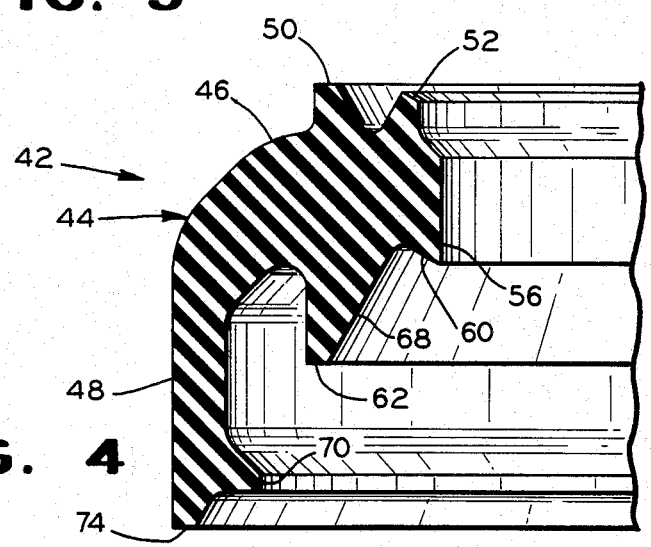
FIG. 4 is a further enlarged, fragmentary view in transverse section of the universal joint seal of FIG. 3.

Referring to FIG. 4, the wider lip 56 of the sealing member 44 has a slanted annular surface 60 facing toward the interior of the bearing cup 20. When lubricant under pressure is supplied through the passage 30 to the interior of the cup, it presses the lip 56 more tightly against the surface 58 to inhibit the egress of lubricant between the sealing member 44 and the cross. Also, as shown in FIG. 4, the lips 50 and 52 terminate in narrow edges having sharp corners. The narrow edges provide narrow contact between the sealing member and the shoulder 54 of the cross. When the lips 50 and 52 are deformed when the cup and cross are assembled, the contact between the lips and the shoulder is even narrower, between corners of the lips and the surface. Thus, where the surface of the shoulder has circular irregularities thereon, the narrow contact of the lips and the surface can provide greater sealing effectiveness than where the resilient sealing member engages the entire surface. This is particularly true when the resilient sealing member is somewhat harder, in the order of 90 durometers, than with the sealing members heretofore commonly used which had a hardness in the order of 80 durometers. It may also be noted from FIG. 3 that the narrow lips 50 and 52 are contoured such as to be deformed outwardly when the cup and cross are assembled, opposite the direction in which water and contaminants would tend to move into the cup. Further, annular cavities are formed between the lips 50 and 52 and between the lip 52 and the wider lip 56 when the resilient sealing member and the cross are assembled. These cavities trap water and contaminants tending to ingress into the cup and also trap lubricant tending to egress from the cup. Any lubricant in the cavities also tends to inhibit the ingress of water and contaminants.

The first portion 46 of the sealing member 44 also has a fourth circular lip 62 extending in a direction opposite that of the lips 50 and 52 and being larger than the lips 50 and 52 so as to be capable of greater deformation if the spacing between the cup 20 and the shoulder 54 of the cross 24 varies. The fourth lip 62 engages a substantially planar edge surface 64 of a wall 66 of the bearing cup 20 along an annular area to provide a first seal between the sealing member 44 and the cup. The larger lip 62 also has a slanted surface 68 facing toward the interior of the bearing cup 20. Lubricant under pressure in the cup 40 acting upon the surface 68 will tend to urge the lip 62 away from the edge of the cup. In this manner, the flow of lubricant supplied to the interior of the cup is controlled by the lip 62 to force the old lubricant outwardly between the resilient sealing member 44 and the cup 20.

The second portion 48 of the sealing member 44 has a fifth, inwardly-extending lip 70 which engages a groove 72 in the cup wall 66 adjacent the end 64 along a narrow area or band to provide a second seal between the sealing member 44 and the cup 20. The groove 72 and the narrower end 64 of the bearing cup enable the outer surface of the leg 48 of the sealing member 44 to be approximately flush with the outer surface of the cup wall 66. This enables easier assembly of the bearing cup 20 with the trunnion 28 by being inserted through an opening in one of the arms of the yoke 16 or 18. The second leg 48 of the sealing member 44 has a sixth, circular edge lip 74 which engages a surface portion or corner 76 of the bearing cup wall 66 along a narrow annular area to provide a third seal between the sealing member 44 and the bearing cup 20. The corner 76 is on the side of the groove 72 opposite the end 64 of the cup. The larger lip 62 primarily contains the lubricant and the narrow lips 70 and 74 primarily inhibit ingress of water and contaminants.

The narrow lips 70 and 74 also terminate in narrow edges with sharp corners. When the lips 70 and 74 are assembled with the cup and cross, they deform outwardly and provide even narrower circular areas of contact with the surfaces of the groove 70 and the corner portion 76 of the groove. These surfaces likewise often have circular irregularities thereon with which the narrow areas of engagement of the lips provide more effective seals. The narrow lips 70 and 74 also tend to deform outwardly like the lips 50 and 52 in the direction opposite the direction of movement of water and contaminants toward the interior of the cup 20. Annular cavities are also formed between the lips 70 and 74 and between the lips 70 and the lips 62 to retain or trap water and contaminants as well as to trap lubricant egressing from the interior of the cup. Again, the trapped lubricant tends to trap and inhibit ingress water and contaminants to further enhance the effectiveness of the seal. More than the two narrow seals 70 and 74 can be employed, particularly in larger universal joints, where there is sufficient room.

From the above, it will be seen that the seal 42 provides at least three sealing contacts with the cross 24 and at least three sealing contacts with the bearing cup 20 to provide controlled containment of lubricant around the needle bearings 38 and to minimize ingress of water and contaminants into the area around the needle bearings. Further, the cup can be readily assembled with the trunnion with the seal 42 mounted on the open end of the cup which is then inserted over the outer end of the trunnion 28. The lips 50, 52, and 56 of the first portion 46 then readily snap into engagement with the shoulder 54 and the adjacent surface 58.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. In combination, a universal joint seal, a cross, and a bearing cup, said cross having a body and a trunnion, said cross also having an annular shoulder and an adjacent surface of circular cross section at the juncture of said body and said trunnion, said adjacent surface being between said shoulder and said trunnion, said bearing cup having an annular groove portion near an open end of said cup which receives said trunnion and having a substantially planar, annular surface at the open end, said seal comprising a resilient sealing member having at least two spaced lips engaging said annular shoulder and a third lip engaging said adjacent surface, said sealing member also having additional lips engaging said annular surface of said bearing cup and the groove portion of said bearing cup, a first of said additional lips engaging said annular surface along a narrow annular area, said first additional lip being substantially aligned with one of said two lips engaging said annular shoulder, at least one of said additional lips engaging the annular groove portion of said bearing cup along a narrow, annular area, and an additional one of said additional lips being spaced from said one additional lip and engaging the side of said annular groove portion opposite the open end of said cup along a narrow, annular area.

2. In combination, a universal joint seal, a cross, and a bearing cup, said cross having a body and a trunnion, said cross also having an annular shoulder and an adjacent surface of circular cross section at the juncture of said body and said trunnion, said adjacent surface being between said shoulder and said trunnion, said bearing cup having an open end which receives said trunnion and having an annular surface at the open end, said seal comprising a resilient sealing member having at least three first lips for engaging said shoulder and said adjacent surface of said cross, one of said three first lips closest to the interior of said bearing cup engaging said adjacent surface, being wider than the other first lips, and serving primarily as a lubricant-retaining seal, said wider lip having a slanted surface facing toward the interior of said cup in a manner such that lubricant under pressure tends to urge said wider lip toward said adjacent surface and prevent the egress of lubricant between said sealing member and said cross, the other first lips being narrow and providing spaced, narrow circular lines of contact with said shoulder and serving primarily to prevent the ingress of water and contaminants into the interior of said cup between said seal and cross, said sealing member having at least three second lips engaging said bearing cup, one of said second three lips closest to the interior of said cup engaging said annular surface of said bearing cup along a narrow, annular area, being larger than the other second lips, and serving primarily as a lubricant control seal, said larger second lip having a slanted surface facing toward the interior of said cup in a manner such that lubricant under pressure in said cup will tend to force said larger lip away from said cup and to force lubricant in said cup outwardly between said sealing member and said cup, and the other second lips engaging said bearing cup outside said larger second lip.

3. In combination, a universal joint seal, a cross, and a bearing cup, said cross having a body and a trunnion, said cross also having an annular shoulder and an adjacent surface of circular cross section at the juncture of said body and said trunnion, said adjacent surface being between said shoulder and said trunnion, said bearing cup having an annular groove portion near an open end of said cup which receives said trunnion and having an annular surface at the open end, said seal comprising a resilient sealing member having at least three first lips for engaging said shoulder and said adjacent surface of said cross, one of said first three first lips closest to the interior of said bearing cup engaging said adjacent surface, being wider than the other first lips, and serving primarily as a lubricant-retaining seal, said wider lip having a slanted surface facing toward the interior of said cup in a manner such that lubricant under pressure tends to urge said wider lip toward said adjacent surface and prevent the egress of lubricant between said sealing member and said cross, the other first lips being narrow and providing spaced, narrow circular lines of contact with said cross beyond said first lip, and serving primarily to prevent the ingress of water and contaminants into the interior of said cup between said seal and said cross, said sealing member having at least three second lips engaging said annular surface of said bearing cup and the groove portion of said bearing cup, one of said second three lips closest to the interior of said cup engaging said annular surface of said bearing cup along a narrow, annular area, being larger than the other second lips, and serving primarily as a lubricant control seal, said larger second lip having a slanted surface facing toward the interior of said cup in a manner such that lubricant under pressure in said cup will tend to force said larger lip away from said cup and to force lubricant in said cup outwardly between said sealing member and said cup, a second of said second lips engaging the annular groove portion of said bearing cup along a narrow, annular area, and a third of said second lips engaging the side of said annular groove portion opposite the open end of said cup along a narrow, annular area and being spaced from said second of said second lips.

* * * * *